(12) United States Patent
Godwin et al.

(10) Patent No.: US 6,169,793 B1
(45) Date of Patent: Jan. 2, 2001

(54) SYSTEMS AND METHODS FOR PROVIDING ORDER AND SERVICE MEDIATION FOR TELECOMMUNICATIONS SYSTEMS

(75) Inventors: Bret A. Godwin, Lakewood; David P. Taylor, Littleton; Michael G. Melonis, Highland Ranch; David W. Mendes, Littleton, all of CO (US)

(73) Assignee: Evolving Systems, Inc., Englewood, CO (US)

( * ) Notice: Under 35 U.S.C. 154(b), the term of this patent shall be extended for 0 days.

(21) Appl. No.: 08/906,751

(22) Filed: Aug. 6, 1997

Related U.S. Application Data

(60) Provisional application No. 60/033,422, filed on Dec. 24, 1996, and provisional application No. 60/033,423, filed on Dec. 24, 1996.

(51) Int. Cl.[7] .................................................. H04M 3/42
(52) U.S. Cl. ........................... 379/207; 379/201; 379/230
(58) Field of Search ................................... 379/207, 230, 379/219, 220, 221, 201

(56) References Cited

U.S. PATENT DOCUMENTS

| | | | |
|---|---|---|---|
| 4,754,479 | 6/1988 | Bicknell | 379/207 |
| 5,210,868 | 5/1993 | Shimada et al. | 395/600 |
| 5,481,603 | 1/1996 | Gutierrez et al. | 379/221 |
| 5,491,742 | 2/1996 | Harper et al. | 379/201 |
| 5,546,452 | 8/1996 | Andrews et al. | 379/219 |
| 5,572,643 | 11/1996 | Judson | 395/793 |
| 5,583,929 | 12/1996 | Ardon | 379/230 |
| 5,590,180 | * 12/1996 | Tonomura et al. | 379/113 K |
| 5,598,464 | 1/1997 | Hess | 379/213 |
| 5,625,681 | 4/1997 | Butler, II | 379/207 |
| 5,661,792 | 8/1997 | Akinpelu et al. | 379/221 |
| 5,682,482 | * 10/1997 | Burt et al. | 706/45 |
| 5,689,555 | 11/1997 | Sonnenberg | 379/220 |
| 5,867,570 | * 2/1999 | Bargout et al. | 379/207 |
| 5,912,962 | * 6/1999 | Bosco | 379/207 X |
| 5,933,489 | * 8/1999 | Sensabaugh et al. | 379/207 X |
| 5,966,435 | * 10/1999 | Pino | 379/207 |

* cited by examiner

Primary Examiner—Creighton Smith
(74) Attorney, Agent, or Firm—Townsend and Townsend and Crew LLP

(57) ABSTRACT

The invention provides systems and methods for facilitating local number portability. In one exemplary embodiment, a local number portability system is provided which is arranged in a telecommunications management network framework. The system is adapted for use with administration center having an administration database for storing and updating subscription data. The system comprises an entry system having an entry database for storing subscription data. The entry system is positioned within a service management layer and is adapted to be placed in communication with the administration center. A service system is also provided which is adapted to be placed in communication with the administration center and which includes a service database for storing subscription information. The service system is located in a network management layer.

44 Claims, 5 Drawing Sheets

SYSTEMS AND METHODS FOR PROVIDING ORDER AND SERVICE MEDIATION FOR TELECOMMUNICATIONS SYSTEMS

CROSS-REFERENCE TO RELATED APPLICATIONS

This application is a continuation-in-part application and claims benefit from U.S. Provisional Patent Applications Ser. Nos. 60/033,422, filed Dec. 24, 1996, and 60/033,423, filed Dec. 24, 1996, the complete disclosures of which are herein incorporated by reference.

BACKGROUND OF THE INVENTION

The present invention relates generally to the field of telecommunications, and more specifically to the management of call processing information. In a specific aspect, the invention provides systems and methods which facilitate the ability to port a telephone number from one local carrier to another carrier.

Until recently, most regions in the United States have been serviced by a single local telephone service provider. For example, in the Inter-Mountain Region, local telephone service was only provided by U S West Communications. In an effort to provide competition in the local service provider market, Congress passed the Telecommunications Act of 1996. As part of this act, all companies are provided with the opportunity to compete in the local telephone service market.

To many individuals and businesses, a telephone number is an important asset. Indeed, studies have shown that a significant number of people and businesses would be hesitant or unwilling to change their local service provider if they were not allowed to keep their same telephone number. To address this problem, the FCC promulgated regulations under the Telecommunications Act to allow customers to port their same telephone number to a new carrier, referred to as Local Number Portability ("LNP"). Under the regulations, each carrier must provide supporting LNP systems which allow customers to order a change in carriers (order mediation) and to service the order to change the carrier (service mediation) within a specific time frame.

As part of the Telecommunications Act, a Number Portability Administration Center ("NPAC") has been chartered and includes a Service Management System ("SMS") which performs the mediation between two carriers when a number is to be ported. More specifically, when a number is to be ported the SMS receives a request from the carrier that is requesting to have the number ported to them. This carrier is referred to as the "new carrier." The carrier that was in possession of the number to be ported is referred to as the "old carrier." It is the responsibility of the NPAC to ensure that both carriers have specified the correct information for the port to occur. If all the information is in order, the new carrier will be notified by the SMS and will then be responsible for activating the ported number.

Under the FCC regulations, each carrier must therefore have the capability to initiate, modify, and provide concurrence for local service orders for consumers and businesses who wish to change local service providers and keep their current phone number. Carriers must coordinate these LNP orders (or subscriptions) with the NPAC. Once LNP subscriptions are approved by the NPAC, the capability must exist for these subscription changes/updates to be distributed to the appropriate network elements so that proper service can be provisioned.

Hence, the present invention provides systems and methods for managing call processing information, and in particular for facilitating local number portability when requested by an individual or business. In one particular aspect, the invention is particularly adapted to be integrated into a telecommunication systems fashioned around a Telecommunications Management Network ("TMN") framework. The invention is also provided to enhance the ability to monitor and audit call processing information to ensure that ports will occur smoothly and without error. The invention is further directed to providing small service providers with a better opportunity to compete in the local service market. Other advantages and features of the invention will be described in greater detail hereinafter.

SUMMARY OF THE INVENTION

The invention provides systems and methods which enhance the ability of a telecommunications system to manage call processing information. Although useful in most telecommunications systems, the invention will find its greatest use when providing local number portability services. However, the invention is not intended to be limited to only local number portability.

In an exemplary embodiment, a method is set forth to provide local number portability to a telecommunications system. According to the method, subscription data is transmitted to an administration center from an entry system. Subscription data is also transmitted from the administration center to a service system. The subscription data at the entry system is then directly compared with the subscription data at the service system. In this way, the subscription data in the entry system and the service system may be audited without the assistance of, or the need to, communicate with the administration center.

After performing the comparison, the method will preferably produce a report of the comparison so that any errors may be detected. In one aspect, an error condition is indicated if the entry subscription data differs from the service system subscription data.

In some cases, it will be desirable to compare the entry system subscription data or the service system subscription data with the subscription data found in the administration center. Hence, according to the method comparisons may be made directly between the entry system and service system and comparisons may also be made between the entry system or service system and the administration center.

In a further aspect of the method, at least one network element is provisioned based on the subscription data stored in the service system. For example, the network element may be provisioned to activate, disconnect or update a subscription request from the administration center. Audits may also be performed on the subscription data transmitted to the network element by comparing the subscription data at the service system with the subscription data at the network element. Preferably, the compared subscription data will include GTT data, LRN data, service provider data, telephone numbers, and the like. In still another aspect of the method, periodic evaluations are made to see if a subscription request from the administration center has been provisioned. In still another aspect, the method provides for periodically evaluating the history of the subscription.

The invention further provides a telecommunications system which is used in connection with administration center having an administration data base for storing and updating subscription data. The telecommunications system comprises an entry system having an entry data base for storing subscription information. The entry system is configured so that it may be placed into communication with the administration center. A service system is also provided and is adapted to be placed in communication with the administration center. The service system includes a service database for storing subscription information from the administration center. The entry system and the service system are in direct communication with each other to allow for direct comparisons between corresponding subscription information in the entry database and in the service database. In this way, audits may be made directly between the entry service database and the service system database, without communicating with the administration center.

In one particularly preferable aspect, subscription information includes information relating to a request to port a local telephone number from one carrier to another carrier. In another aspect of the system, the entry system is provided with an open interface to allow external access to the entry database. For instance, the open interface may comprise a graphical user interface which may be used with a Web browser. Similarly, the service system may be provided with an open, interface to allow external access to the service database. In still yet another aspect, the system further includes a plurality of network elements which are provisioned by a network element management system which interfaces the network elements to the service system.

The invention still further provides an exemplary local number portability system which is arranged in a telecommunications management network ("TMN") framework. Such a framework is provided to segregate a telecommunications system into various layers. The TMN architecture into which the system of the invention is integrated includes a service management layer, a network management layer, an element management layer and a network element layer. The system of the invention is particularly adapted for use with an administration center having an administration database for storing and updating subscription data and which is typically located in the network management layer. The system of the invention includes an entry system having an entry database for storing subscription data. Further, the entry system is located in the service management layer and is adapted to be placed in communication with the administration center. The system further includes a service system which may be placed in communication with the administration center and which includes a service database for storing subscription information. Further, the service system is located in the network management layer. With this arrangement, the system of the invention may be adapted to existing telecommunications systems which are arranged using the TMN framework. In this way, local number portability services may conveniently be integrated into existing telecommunications systems.

In one aspect, a network element management system is further provided for transmitting subscription data to at least one network element. The network element management system is placed in communication with the service system to receive information from the service database. Further, the network element management system is in the element management layer. In another aspect, a plurality of network elements are provided and are in communication with the network element management system. Further, the network elements are in the network element layer.

In one alternative aspect, the service system and the entry system are in direct communication with each other to allow for direct comparisons between corresponding subscription information in the entry database and the service database. Optionally, the entry system and service system may be provided with open interfaces to allow external access to their entry databases. For example, the open interface may comprise a graphical user interface which can be accessed with a Web browser.

In another embodiment, the invention provides an exemplary method for providing local number portability services to a telecommunications system that is arranged in a TMN framework. According to the method, an entry system is placed in a service management layer of the telecommunications system to receive subscription requests and to transmit subscription information to an administration center. A service system is placed in a network management layer of the telecommunications system to receive subscription information from the administration center and to provision network elements of the telecommunications system based on the subscription information.

In another aspect of the method, a network element management system is placed in an element management layer. The network management system is situated between the service system and the network elements to provision the network elements based on the subscription information transmitted from the service system. Optionally, the entry system and the service system may be placed in direct communication to perform audits directly between the two systems.

In still another embodiment of the invention, an exemplary method is set forth for providing call processing services to a plurality of different service providers which share at least one common network element. According to the method, the switches, which are serviced by a plurality of different service providers, are placed in communication with the common network element. Call processing information is then transmitted to the common network element from an associated service management system. Call routing information may then be routed to selective switches based on the transmitted information. In this way, smaller local carriers may be able to compete in a larger market by simply accessing a network element which is serviced by another provider. Such a method therefore reduces costs which would serve as a barrier to entry into the local service provider market.

In one aspect of the method, the call processing services include local number portability services which allow a port request to be transmitted to the common network element from a service management system. Call routing information may then be transmitted from the service management system to the switch serviced by the service provider of a calling party to route the call to the switch of a called party. Typically, the service management system will be in parallel with a plurality of service management systems, each of which is in communication with an administration center so that they may receive the subscription information.

In still another exemplary embodiment, the invention provides a telecommunications system which comprises a service management system serviced by a main service provider. At least one network element communicates with the service management system to receive call routing information from the service management system. A plurality of switching devices are in communication with the network element. Further, at least some of the switching devices are operated by different service providers. In this way, smaller service providers may purchase or lease space from a switching device owned by another service provider so that they more easily gain access to the local service provider market.

In one aspect, the network element comprises a STP element or a SCP element. Preferably, the service management system includes a database which stores local number portability subscriptions and includes a means for transmitting a least a portion of the subscription information to the network element. Further, the service management system is preferably adapted to be placed in communication with an administration center having number portability subscription information. In another aspect, a network element management system is provided to interface the service management system to the network element.

In yet another embodiment, the invention provides an exemplary telecommunication system which comprises a local service management system having an interface which is adapted to selectively interface with a plurality of administration centers. In this way, versatility is provided to the system by allowing one type of service management system to interface with different types of administration centers.

In one exemplary aspect, the interface comprises a modular interface which can be selectively removed and replaced with another interface to accommodate different types of administrative centers. In another aspect, an entry system is preferably also provided, which has an interface which is adapted to selectively interface with different administration centers. Optionally, each administration center may be provided with an administration code and each local service management system or entry system includes the means to configure the interface to communicate with the administration to which the service management system or entry system is interfaced.

DETAILED DESCRIPTION OF THE SPECIFIC EMBODIMENTS

Figure 1:
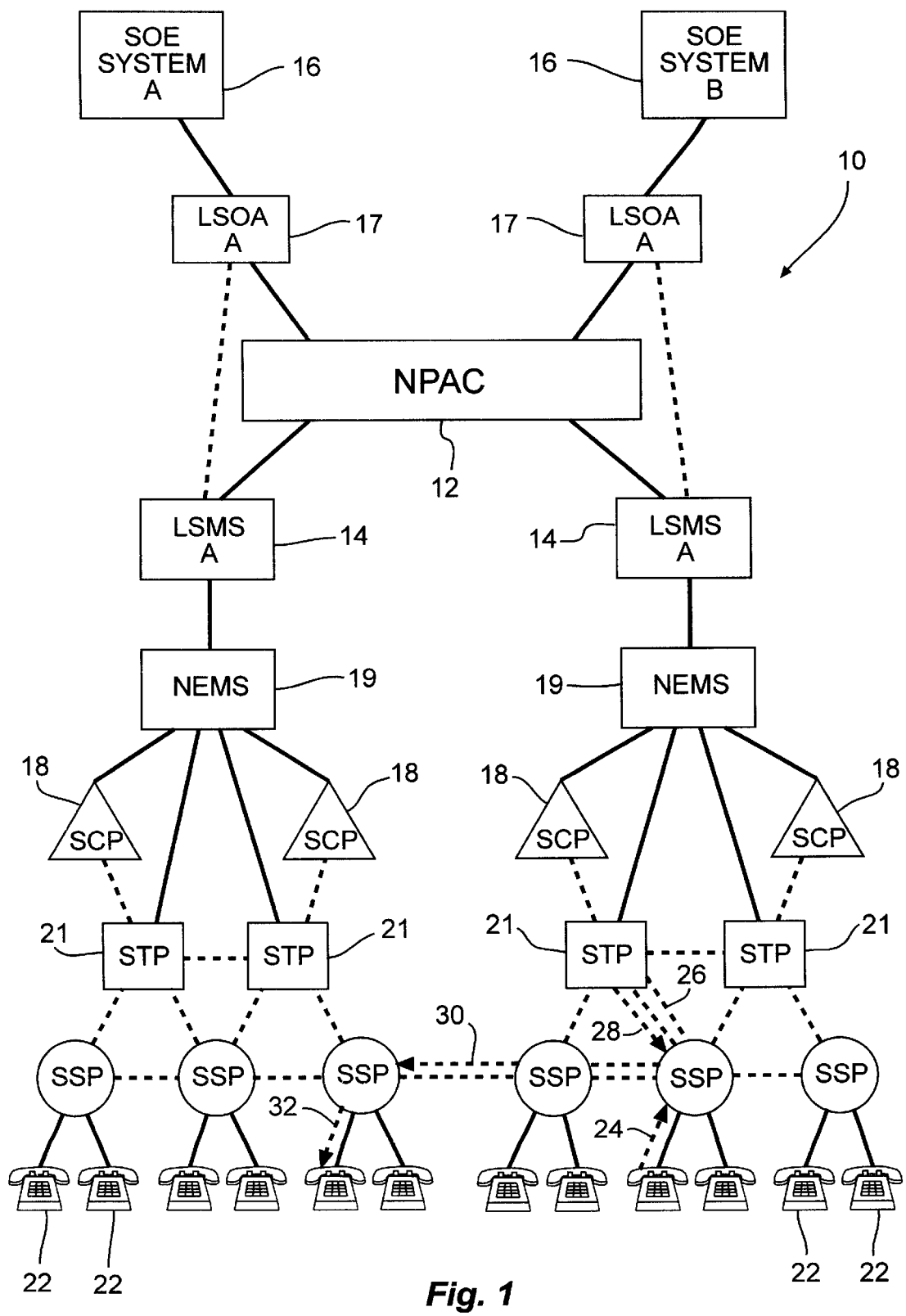
FIG. 1 illustrates an exemplary LNP system according to the present invention.

Referring now to FIG. 1, reference will be made to an LNP system 10. Central to system 10 is a Number Portability Administration Center ("NPAC") 12. NPAC 12 is in communication with a plurality of local telephone carriers, each having a Local Service Management System ("LSMS") 14 (with only two being shown for convenience of illustration). NPAC 12 includes a Service Management System ("SMS") which performs mediation between two of the telephone carriers when a telephone number is to be ported.

System 12 further includes a plurality of Service Order Entry ("SOE") systems 16 which are provided for entering certain information into NPAC 12. Mediation between SOE systems 16 and NAPC 12 is accomplished by providing Local Service Order Administration ("LSOA") systems 17 which function as an interface to allow number porting requests to be sent to NPAC 12 from each SOE system 16. In some cases, the LSOAs 17 may be configured to handle the functions of the SOE systems 16 so that separate SOE systems 16 will not be required.

Each LSMS 14 is in communication with an associated Network Element Management System ("NEMS") 19. In turn, each NEMS 19 is associated with appropriate Service Control Points ("SCP") 18 and Service Transfer Points ("STP") 21. Exemplary NEMSs are described in copending U.S. application Ser. No. 08/907,323, issued as U.S. Pat. No. 6,122,362, filed on the same date as the present application (Attorney Docket No. 17349-00210), the complete disclosure of which is herein incorporated by reference. SCPs 18 and/or STPs 21 contain information specific to each ported customer. For example, each SCP 18 and/or STP 21 will preferably include telephone numbers ("TN"), local routing numbers ("LRN"), NPA-NXX numbers, global title translation numbers ("GTT"), and the like.

In communication with the SCPs 18 and STPs 21 are at least one Service Switch Point ("SSP") 20. SSPs 20 are the physical switching devices used to route calls to specific telephones 22. As shown in phantom line, SSPs 20 are all in communication with each other to allow calls to be appropriately routed.

Still referring to FIG. 1, the process of porting a TN from one carrier to another carrier will be described. Initially, a customer will contact a new carrier to which the customer's TN will be ported and request a change, referred to as a subscription. Such contact with the customer will preferably be at the new carriers SOE system 16, e.g., SOE system B. The old carrier and the new carrier will then typically communication the desired change to each other and send the subscription information to NPAC 12 for approval. The subscription information is sent from the old and new carrier's SOE systems 16 via their respective LSOAs 17. The request may include information including the TN to be ported, routing information, GTT information, and the like.

If all the information is in order, NPAC 12 will approve the subscription and send a change request to each LSMS 14. Each LSMS 14 logs the request and validates the request to ensure it contains correct information. If the request is valid, each LSMS 14 creates and stores the new subscription in a database.

After the subscription is created locally at the appropriate LSMS 14, each LSMS 14 sends a creation request to the associated NEMS 19 which in turn forwards the appropriate subscription information to the appropriate SCP 18 and/or STP 21. In turn, SCP 18 and/or STP 21 transfers the subscription data to the appropriate SSP 20 in response to a call to a ported number.

If unable to successfully complete the port, NEMS 19 will send a failure message to LSMS 14. Otherwise, a success message will be produced and sent to LSMS 14. In turn, LSMS 14 sends information to NPAC 12 indicating a successful port has occurred. NPAC 12 then updates its database and sends the updated information to the originating LSOA 17 so that their records can also be updated to show the number has been ported.

In this way, a customer may easily change their local carrier while still keeping their own TN by simply contacting a new carrier and requesting the change. Upon activation of the TN by a new carrier, each LSMS 14 will have its information updated so that every carrier will know who is servicing the ported number.

Once the port is completed, the routing of a call between two of telephones 22 is as follows. Initially, a caller dials the called's TN (which has been ported). As indicated by arrow 24, the call goes to the associated SSP 20, i.e. the switch serving the calling party. SSP 20 is configured to recognize whether the NPA-NXX number is in a portable region. In the event that the region is not a portable region, SSP 20 routes the call to the called's telephone 22 using the NPA-NXX of the called's party TN.

In this example, however, the NXX number is in at portable region. Hence, SSP 20 queries the associated SCP 18 and/or STP 21 as to whether this number has in fact been ported (see arrow 26). SCP 18 and or STP 21 knows whether the number has been ported because each LSMS 14 is provided with information on each port by NPAC 12 as previously described. Hence, LSMS B has already transmitted information regarding the port to SCP 18 and/or STP 21 to activate the number. If the number has been ported, SCP 18 and/or STP 21 transmits call routing information to SSP 20 (see arrow 28) which in turn causes the call to be sent to the called's SSP 20 as indicated by arrow 30. The called's SSP 20 then routes the call to the appropriate telephone 22 as indicated by arrow 32.

Figure 2:
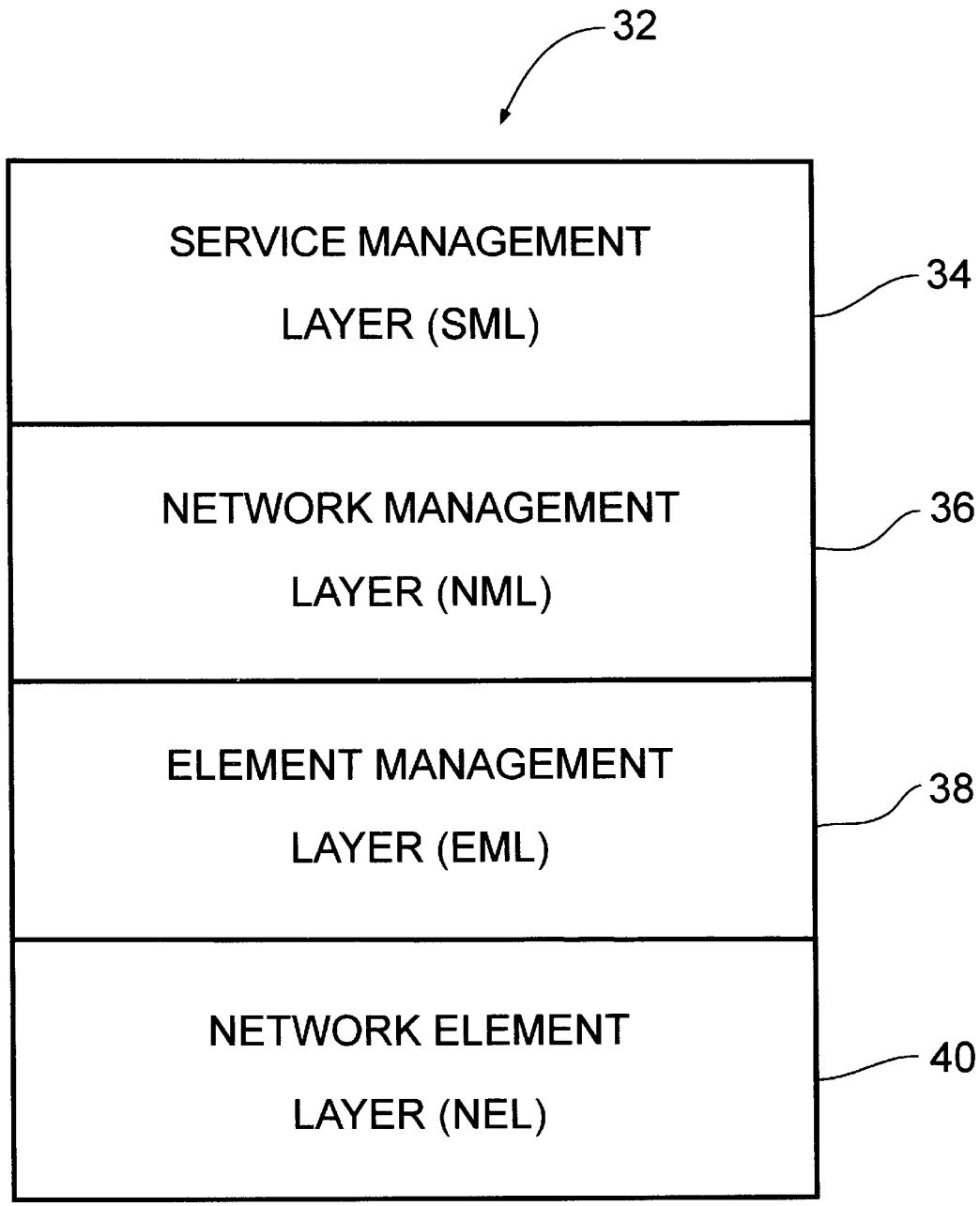
FIG. 2 is a schematic depiction of a telecommunications management network functional hierarchy.

One important feature of the invention is that it may be used to provide number portability with telecommunications systems which are patterned after the Telecommunications Management Network ("TMN") architecture, although it will be appreciated that certain aspects of the invention may be useful with other types of architectural designs as well. The framework of the TMN architecture is illustrated in FIG. 2 which is depicted generally be reference numeral 32.

The TMN architecture provides a functional hierarchy of logical layered levels which break down the telecommunication system into operation layers. Each layer restricts various management activities to within the boundary of each layer. At the top level of the TMN architecture is a service management layer ("SML") 34. SML 34 is responsible for managing the contractual aspects, e.g., collecting orders, for various call processing services. The TMN architecture may also include a business management layer which is generally responsible for the total enterprise.

Below SML 34 is a network management layer ("NML") 36. NML 36 is generally responsible for managing all network elements on a global basis by providing the functionality to manage a network by coordinating activities across the entire network. Below NML 36 is an element management layer ("EML") 38. The bottom level is a network element layer ("NEL") 40 which manages each network element on an individual basis. The specifics of the TMN architecture is well known to those skilled in the art and need not be described in any greater detail.

Figure 3:
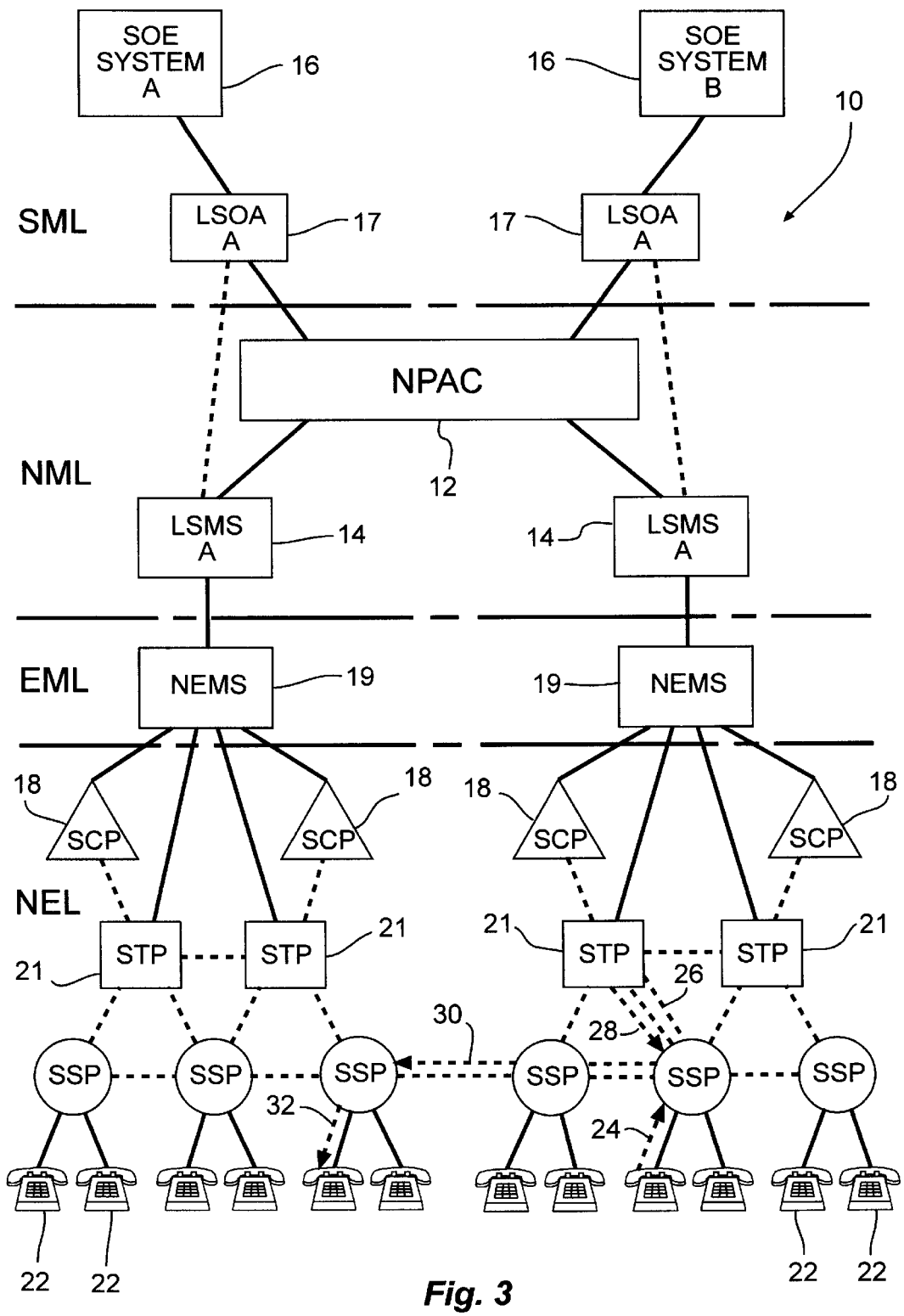
FIG. 3 illustrates the LNP system of FIG. 1 sectioned according to TMN architectural layers according to the invention.

As illustrated in FIG. 3, LNP system 10 is developed around the TMN architecture to allow local number portability services to easily and conveniently be integrated into existing telecommunications systems which are patterned around the TMN architecture. As shown, LSOA 17 is positioned within SML 34 and interfaces with an existing SOE system 16. With this arrangement, LSOA 17 captures subscription information associated with the number of porting process, supplements the subscription data, stores the subscription data, and then forwards the information to the NPAC 12 which resides in a network management layer. LSMS is placed in the network management layer (as is NPAC 12) so that it may process LNP subscription modifications, disconnects, and updates received from NPAC 12. Such data may then be transmitted to NEMS 19 which is placed in the network management layer. Finally, the various network elements and switches are placed in the network element layer.

Hence, by including LSOA 17 in the service management layer and LSMS 14 in the network management layer, number of portability services may easily be integrated into a telecommunications system patterned after the TMN architecture. More specifically, and as described in greater detail hereinafter, LSOA 17 provides an appropriate interface between existing SOE systems and NPAC 12 so that subscription data may be appropriately forwarded to NPAC 12. LSMS 14 in turn provides a way to process LNP subscription data which is received from NPAC 12 so that the appropriate network elements may be appropriately provisioned.

The design and function of LSOA 17 will now be described in greater detail to illustrate its usefulness as an interface to an administration center and to process and manage subscription requests and information. A main function of LSOA 17 is to provide order mediation, i.e., the supplementation of order information which is then routed down stream to other systems for processing. Many current SOE systems are bound by existing infrastructure and have limited expandability. Hence, LSOA 17 provides a mechanism for orders to flow to new systems that do not comply with an existing order distribution process. In one particular application, LSOA 17 provides the subscription mediation between existing SOE systems and new number portability systems to provide a path for order distribution.

In summary, important functions provided by LSOA 17 are to process subscription data from existing SOE systems and then forward the data to NPAC 12. LSOA 17 also receives notifications from NPAC 12 regarding subscription porting activity. Another feature of LSOA 17 is that it provides users with the ability to manage various types of data on NPAC 12. For example, users may manage subscription data, network data, service provider data, and the like. Another feature of LSOA 17 is that it provides predefined reporting and adhoc reporting capabilities for tracking subscription activity. LSOA 17 also supports NPAC 12 audit procedures as well as providing the ability to audit subscription data against LSMS 14 as described in greater detail hereinafter.

In the LNP arena, LSOA 17 provides an interface to existing SOE systems to integrate the porting of numbers with existing order management processes. LSOA 17 supports interfaces to SOE systems through the development of interface adapters which provide functionality to process subscription data for ported numbers.

Figure 4:
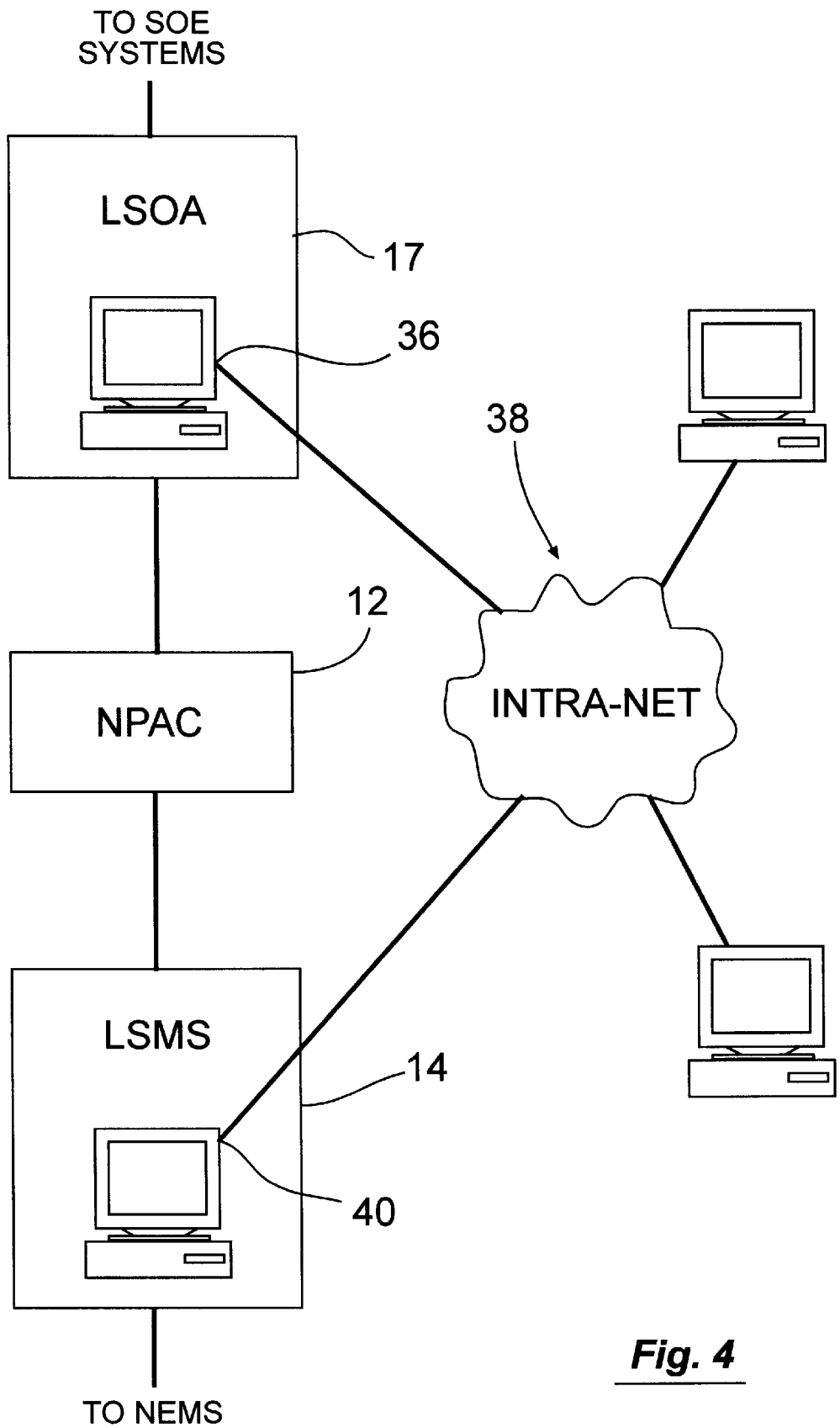
FIG. 4 illustrates various computer systems within an LNP system which are placed in communication through an intranet connection according to the invention.

LSOA 17 may receive subscription data through a mechanical interface to SOE system 16 or manually through a graphical user interface ("GUI") 36 as illustrated in FIG. 4. GUI 36 provides a user with the ability to access information stored in LSOA 17 using an appropriate Web based browser, such as a Netscape 3.0 or compatible browser. As illustrated in FIG. 4, use of GUI interface 36 allows for various intranet connections as illustrated generally by reference numeral 38. In this way, any computer having appropriate intranet connections (and having appropriate password information) may access the LSOA database. Preferably, when a user accesses a GUI function that involves data that may be changed, LSOA 17 will log the date, time, and the last user who modified the data.

After subscription data is entered into LSOA 17, the data is supplemented, stored, and then forwarded to NPAC 12. For instance, after the subscription data has been entered, GTT data may be added and stored with the subscription data in the LSOA database. After such information is transmitted to NPAC 12, LSOA 17 may periodically receive notifications from NPAC 12 regarding the subscription porting status. LSOA 17 may also be employed to initiate audits of NPAC 12 and receive audit information from NPAC 12. LSOA 17 also has the ability to produce alarms when a processor interface is having connection problems or fatal conditions. Further, LSOA 17 has the ability to produce subscription management and system management reports to facilitate the number porting process.

LSOA 17 allows for the creation, modification, deletion, and view of subscription versions. A user can choose to view the subscription as it exists on the LSOA database, or from the NPAC database. By way of illustration, SOA 17 allows for the following subscription data fields to be defined or modified: Ported TN, LRN, LIDB DPC, LIDB SSN, CNAM DPC, CNAM SSN, CLASS DPC, CLASS SSN, ISVM DPC, ISVM, SSN, due date, billing ID, comments, and the like.

Following creation of a subscription request, LSOA 17 processes the request to insure that each request contains all required information, contains valid information, is routed to the appropriate NPAC 12 based on the NPA-NXX of the subscription, and is received by NPAC 12. LSOA 17 will also validate that the subscription contains Gateway GTT data. If a subscription does not contain such Gateway GTT data, the subscription will be augmented with the appropriate Gateway GTT data elements based on the LRN of the subscription.

In addition to transmitting subscription information to NPAC 12, LSOA 17 is also configured to receive certain messages from NPAC 12. Such messages can include, for example, cancellation of a subscription request, completion of a subscription request, creation of a subscription request, the change in status of a subscription request, a TN that is available to be returned to a donor SSP, concurrence notifications, failed broadcasts notifications, and the like. Further, LSOA 17 is able to notify users of incoming notifications. Such notifications and their status are stored in the LSOA database for querying.

Another feature of LSOA 17 is that it may modify subscription requests that were previously submitted to NPAC 12. Preferably, such requests will be modified when the status of the subscription on NPAC 12 is active, pending, conflict, or conflict resolution pending. If the current service provider is a new service provider for the subscription, the following subscription data can be modified: LRN, Gateway GTT data, due date, billing ID, end user location value and type, and the like. If the current service provider is an old service provider, then the due date and old service provider authorization information may be modified by the user. LSOA 17 also allows for a service provider to authorize or not authorize subscriptions being ported when they are the old service provider.

Still another feature of LSOA 17 is that it allows the user to request a bulk download of subscription data from NPAC 12. The bulk download file from NPAC 12 is manually transferred to LSOA 17. From the GUI, the user can then filter the updates to be performed by a request for a single TN, a request for a range of TNs, a request for a range of activation times, and request for a specific service provider. LSOA 17 updates the local subscription database with the download from NPAC 12. Any data matching the filter contained in the NPAC download is placed into the LSOA database. Therefore, existing subscription records may be overwritten with the subscription data from NPAC 12.

One advantageous feature of LSOA 17 is that it provides users with the ability to modify and query their own service provider data through the GUI. For a query, the user has the option to query from the LSOA 17 database or to retrieve the data from NPAC 12. Such data can include, for example, the name, address, telephone number, and contact organization, NPAC customer type, security contact, repair contact and billing contact. The service provider data associated with other service providers in the NPAC 12 database is available to query and view via the LSOA GUI 36. For other service providers, the data available for viewing is the service provider name and ID.

LSOA 17 further provides a variety of management features which allow users to manage various network data. For example, LSOA 17 allows users to add, delete, and query LRNs associated with their own service provider data via GUI 36. For a query, the user has the option to query from the LSOA database or to retrieve the data from the NPAC 12 database. Additions and deletions of LRN associations are sent to NPAC 12. As another example, LSOA 17 allows users to add, modify, delete and query Gateway GTT data for each unique LRN defined for their own service provider. The Gateway GTT data is retrieved from the LSOA 17 database and may include, for example, CLASS DPC, CLASS SSN, LIDB DPC, LIDB SSN, ISVM DPC, ISVM SSN, CNAM DPC, and CNAM SSN. In another example, LSOA 17 allows users to add, delete, and query NPA/NXXs assigned to their own service provider. For a query, the user may query the LSOA 17 database or receive the data from NPAC 12. Additions and deletions of NPA/NXX associations are sent to NPAC 12.

LSOA 17 includes a monitor having a window which allows a user to query, monitor, and manage application activity. From this window, all activity may be viewed utilizing various filters, such as data, activity type, activity status, user ID, TN, and the like. Also from this window, the user can perform various functions depending on the status of the activity, including, for example, resubmittal of failed activities, cancelled activities, set activities status of success, navigate to an appropriate operation, i.e., view, modify, and the like. Further, LSCA 17 tracks and logs a variety of activities, including, for example, subscription creation, modification and deletion, either by external systems or by the GUI subscription events, including activation, cancellation, conflict, conflict resolution, disconnects, and errors, NPA-NXX and LRN creation and deletion, NPAC SMS notifications, NPAC audit and synchronizer audit as described in greater detail hereinafter.

One particular advantage of LSOA 17 is that it allows the user to perform subscription audits against either NPAC 12 or each LSMS 14 within the NPAC region via GUI 36. Such an audit can be performed against a single TN or a range of TNs, a specific service providers network or multiple service provider networks, an activation date range, all LNP data, or a combination of LIDB, CLASS, CAMN, ISVM, and LRN data. Preferably, each audit will be given a user defined audit name. The NPAC audit will query individual subscriptions on NPAC 12 and report on discrepancies found in comparison as stored in the LSOA database. The LSMN audit is conducted by the NPAC and reports on subscription discrepancies between the specified LSMSs 14 and NPAC 12. These discrepancies can be viewed by the user via the LSOA GUI 36.

One particular advantage of system 10 is that audits of the LSMS 14 subscription data may be made directly against the subscription data in LSOA 17. Such audits may be based upon a single TN, a range of TNs, activation date/time and the like. In these audits, data is retrieved from LSMS 14 and LSOA 17 independently from NPAC 12. In this way, a separate extraction of information from NPAC 12 is not required to audit the LSOA and LSMS databases. Such a process is shown by the dashed line in FIG. 1.

Following the comparison of the two databases, a discrepancy file is produced for analysis. As illustrated in FIG.

4, LSMS includes a GUI 40 to allow for communication with intranet connection 38 so that audits may be performed and viewed using an appropriate GUI. At the GUI, a user can query and monitor the status of audits. The GUI will preferably include a window to display the name, status, service provider and user of each audit. The results may also be viewed from a window and may include, for example, discrepancies in TNs, service providers, attributes, i.e., LRN, CLASS DPC, and the like, error type, i.e., mismatched, not found, and the like, and other data.

LSOA 17 is configured so that it may interface with a large number of separate NPAC regions, including those which are compliant with the NPAC to SOA interface defined in the NANC Interoperable Interface Specification. Each defined NPAC to SOA interface includes a dedicated connection as well as a back up connection. LSOA 17 provides logging functionality for various conditions including, association termination messages, invalid signature, sequence out of order, generalized time out of range, invalid user ID, invalid organization address, inadvertent association disconnects. LSOA 17 insures NPAC message delivery by validating that each message results in a positive acknowledgement by NPAC 12.

LSOA 17 also allows connections to other NPACs that are not compliant with the NPAC to SOA interface defined in the NANC Interoperable Interface Specification. This is preferably achieved via an adapted protocol across a dedicated interface. LSOA 17 will then provide logging functionality for various conditions including, association termination messages, invalid signature, sequence out of order, generalized time out of range, invalid user ID, invalid organization address, inadvertent association disconnects via the interface, and the like. LSOA 17 insures NPAC message delivery by validating that each message results in a positive acknowledgment by NPAC 12.

LSOA 17 includes a standard subscription management API which allows for the creation, modification, and deletion of subscription versions. This API can be used to construct an interface to existing SOE systems. The LSOA subscription management API also supports various NPAC notifications back to existing systems including, subscription version completion, subscription version cancellation, and subscription version disconnect to a donor SSP.

From LSOA GUI 36, a system administrator can perform a variety of functions, including definition and management of users, management of application tunables by impact region, management of application wide tunables, and management of application tunables related to external system interfaces. Another feature of LSOA 17 is that it is able to log various application errors including, for example, data validation errors such as LRN service provider look up, data inconsistencies such as invalid TN format, audit failures, incomplete messages form NPAC 12, the inability to communicate with system interfaces, and the like. Still another feature of LSOA 17 is that it allows the user to define NPA splits. For example, a variety of data may be defined for NPA split, including current NPA, new NPA, NXX (either single or ranged, permissive dialing start date and time, permission dialing end date and time, and the like. LSOA 17 will preferably automatically convert to the new NPA if a subscription request is receive for the current NPA and the due date is within the permissive dialing period. Existing subscriptions belonging to the old NPA may also be updated in LSOA 17.

LSOA 17 is capable of storing a wide variety of data types, including, for example, subscription data, network data (NPA-NXX and LRN), service provider data, GTT data, NPAC information, and the like. Data is stored in LSOA 17 in a relational database using tables and indexed fields. Data can be retrieved from the tables using the GUI or by using an a data base query and reporting tool. LSOA 17 may manage two forms of service provider data: all carrier service provider IDs and names, and service provider data which is specific to the carrier that is operating the particular LSOA, referred to as owner service provider data. The owner service provider data may be altered in LSOA 17 and subsequently sent to NPAC 12.

LSOA 17 maintains GTT data associated with each LRN. Preferably, this will contain the Gateway GTT data to be sent with each subscription request to NPAC 12. With LSMS, the Gateway GTT data can be translated into the final GTT data as a function of LSMS 14. For each NPAC that is connected to LSOA 17, contact data that is specific to the NPAC operation center and the network addressing information is maintained in the LSOA database.

LSOA 17 is preferably interfaced with NPAC 12 using a stand alone quad CPU K460 machine, commercially available from Hewlett Packard. Subscription record capacity within LSOA 17 may be varied by providing appropriate disc space. For instance, about 3 gigabits of memory will typically be needed for one million subscription records. The software utilized in LSOA 17 preferably uses an HP-UX version 10.20 operating system. The software in LSOA 17 may be executed on a HP-9000 K class Enterprise server. A PA-8000 64 bit RISC processor or higher will preferably be employed. All memory, disc and archival devices will preferably be supported by HPUX and HP-9000 architecture. Storage capacity for the database in LSOA 17 will typically be based on the storage subscription data, transient activity (churn), log file sizing, NPAC interface transaction performance, the number of users, and the number of attached NPACs. LSOA 17 may optionally be configured to support high availability. Such a configuration is provided by using HP MC/service guard. This will allow an automatic switchover from a primary system to a secondary system thereby reducing application down time.

Still referring to FIG. 1, operation and construction of LSMS 14 will now be described in greater detail. LSMS 14 is included within system 10 to provide the coordination of ported number modification and disconnect requests from NPAC 12 to SCPs 18 and/or STPs 21. LSMS 14 provides mediation between NPAC 12 and such network elements during the provisioning process for number portability. Hence, LSMS 14 is provided to facilitate LNP with a variety of functions including, the receipt of subscription, network, and service provider data from NPAC 12, the processing and storing of subscription, network, and service provider data, the updating of network elements through NEMS 19, the performance of audits against NPAC 12 and SCPs 18 and/or STPs 21, responding to NPAC 12 audit queries, the processing of mass updates received from NPAC 12, supporting repair of provisioning failures, and the like.

In use, LSMS 14 receives and forwards subscription modifications, disconnects, and updates of new subscription versions from NPAC 12 to NEMS 19 for provisioning SCPs 18 or STPs 21. LSMS 14 validates that the data is in the correct format and will perform look ups against NPA/NXX, LRN, and service provider ID. If a subscription record fails validation, an error is logged, the subscription is placed into an error status within the activity manager, and an error message is sent back to NPAC 12.

Network data is received from NPAC 12 to indicate new or removed LRN and NPA-NXXs available for porting for all areas in the regions serviced by NPAC 12. The LSMS 14 database is updated when these notifications are received from NPAC 12. Users may also create or remove LRN and NPA-NXXs associated with their own service provider ID using LSMS GUI 40 (see FIG. 4). This information is sent to NPAC 12. Network data will preferably only be allowed to be removed if all subscriptions referring to an NPA-NXX or LRN have expired first.

LSMS 14 provides users with the ability to modify and query their own service provider data via the LSMS GUI 40. For a query, the user has the option to query from the LSMS 14 database or retrieve the data from NPAC 12. Data for a user's own service provider may include, for example, name, address, phone number and contact organization, NPAC customer type, security contact, repair contact, and billing contact. The service provider data associated with other service providers in the NPAC region may be queried and viewed via LSMS GUI 41). For other service providers, the data available for viewing is the service provider name and ID.

Another feature of LSMS 14 is that it translates Gateway GTT to final destination GTT data for older service provider subscription versions. LSMS 14 also exists for the creation, modification, deletion of unique user IDs to provide security for the system. Similar to LSOA 17, LSMS 14 has a computer system with a window to query, monitor and manage application activity. LSMS 14 tracks and logs a variety of activities, including subscription activity by NPAC 12 and by the LSMS GUI, subscription events, including modification, cancellation, disconnects and errors, NPA-NXX and LRN creation and deletion, NPAC SMS notifications, NPAC audits, and the like. Subscription data may be viewed and modified from the LSMS 14 database or viewed from NPAC 12.

LSMS 14 includes an editor which allows a user to create NPA-NXX, delete NPA-NXX, create LRN, delete LRN, create GTT final destination data, modify GTT final destination data, delete GTT final destination data, and create NPA splits. A service provider data editor is also provided to provide editing of the service provider's own information which is sent to NPAC 12.

LSMS 14 further includes an audit initiator which allows for a variety of audits. The selection criteria for each audit may be based on a single TN, a TN range (within an NPA-NXX), time range (all TNs updated in a time range), and LRN GTT data attributes. LSMS 14 is able to perform NPAC generated file audits, NPAC query audits, and SCP audits.

NPAC generated audits compare the LSMS 14 database information against the NPAC 12 database. To perform the audit, an NPAC bulk data file is retrieved from NPAC 12 using FTP or tape. The NPAC data audit will preferably apply filter criteria entered by a user on the LSMS GUI 40 against the file and perform a comparison against the LSMS 14 database. One purpose of the NPAC generated file audit is to compare a large range of subscription data between LSMS 14 and NPAC 12. The filter criteria which may be used for the NPAC data audit is a single TN, a TN range, activation time, attributes of LRN or GTT data and the like.

The NPAC query audit compares LSMS 14 database information against the NPAC 12 database. Audit data is compared directly against the NPAC versus a bulk data file. The audit will preferably apply filter criteria similar to that used with the generated file audits.

LSMS 14 may audit any of the SCPs 18 and/or STPs 21 which are attached to a NEMS 19 (which in turn is attached to LSMS 14). SCP and/or STP subscription records are compared against the LSMS 14 database to ensure consistency among the databases. This audit may be performed in real-time when selected by a user. The SCP and/or STP audit may be selected for a single TN or a range of TNs. A variety of filter criteria may be employed, including a single TN, a TN range, or attributes of LRN on GTT data.

The interface between LSMS 14 and NPAC 12 will preferably be compatible with the NANC Interoperability Interface Specification. However, other interfaces may also be provided. Such an interface provides real-time messaging between LSMS 14 and NPAC 12. When NPAC 12 sends a modification or disconnect message to LSMS 14, the interface creates a message containing the subscription data. A message is then sent to LSMS 14 indicating that a message was received from NPAC 12. The message is processed and a response is sent to the interface, which then sends a response to NPAC 12. LSMS 14 may also request or update data on NPAC 12. In either case, LSMS 14 sends a message to the interface which then creates an object and performs the desired function and returns data or a status to LSMS 14.

The interface between LSMS 14 and NPAC 12 will preferably utilize an HP OSI 9000 stack to provide RSC 1006 peer to peer communication. The OSI stack is preferably CTS-3 certified and a DSET tool kit is preferably used to provide BER X.209 encoding. In addition to the OSI stack, a DSET CMISE agent tool-set is preferably used to provide the manager/agent functionality for the generalized description for managed objects.

CMIP messages are transmitted and received across the OSI communication interface. The interface performs automatic retransmission, logs error conditions, and updates the CMIP objects on both systems to reflect the actions associated with each message. The interface preferably supports GDMO for subscription, network and service provider data. The interface preferably provides for NPAC initiated subscription, network, and service provider data updates. The interface further provides for LSMS to NPAC network and service provider data creation, deletion, and updates. Further, the interface provides for various NPAC notifications, including system down time and first subscription ported in an NPA-NXX.

The interface will preferably be configured to retry communication errors a set amount of times before a communications failure alarm is generated. The interface will preferably also log all CIMP and/or SI communication errors. Such errors may include, for example, communication link failure, invalid messages, time outs, security violations, and encoding/decoding failures. Error log files may be viewed and printed from the LSMS GUI 40. LSMS 14 will preferably be configured to support a plurality of interfaces so that LSMS 14 may be provided with a number of different NPACs.

LSMS 14 will preferably further include an interface to NEMS 19 so that it may appropriately communicate with the: NEMS. Preferably, NEMS 19 will coordinate SCP mated pairs and SCP N+1 configuration synchronization. The interface to NEMS 19 will preferably provide two-way communications to transmit messages such as the creation of new subscriptions, modifications of subscription information, removal of subscriptions and query of subscriptions. All modification and disconnect subscription activity is forwarded from LSMS 14 to NEMS 19 to update SCPs 18 and STPs 21. LSMS 14 may be configured to support a plurality of different NEMSs 19. This is accomplished by providing a domain routing table to establish a mapping between the NPA-NXX or LRN and the NEMS 19. Each ported NPA-NXX or LRN is associated with one or more NEMS 19 to update SCPs 18 and STPs 21 attached to it. If only one NEMS 19 is connected to LSMS 14, then all ported subscription will be sent to that system.

Referring now to FIG. 4, LSMS GUI 40 will be described in greater detail. One particular use of GUI 40 is to manage system configuration parameters. GUI 40 includes a configuration editor which provides windows enabling the user to change the system parameters for components such as each NPAC interface, the HTTP interface for the Web server, the LSMS application software, and NEMS interfaces. GUI 40 also allows a user to update NPAC information. The NPAC information will preferably contain the contact, interface security, and network address information associated with each NPAC connection. GUI 40 also allows a user to update the NEMS information. Such information can include, for example, the name, ID, type and specifications associated with each NEMS 19 that is connected to LSMS 14.

LSMS 14 also provides functionality that supports NPA splits. NPA split information may be entered by users through GUI 40. If an NPA record exists in LSMS 14 and the permissive dialing period begins, LSMS 14 will automatically create a mass update to all subscription records associated with NXXs in the NPA that is splitting. For network elements that require duplicate subscription records during the permissive dialing period, LSMS 14 will send a new record to the NEMSs 19 when the mass update occurs. During the permissive period for NPA split, NPAC 12 will only send subscriptions that contain TNs with the new NPA. LSMS 14 will send both the old and new TN to the NEMSs 19 for network elements that require both records. At the end of the permissive dialing period for a NPA split, LSMS 14 will remove the old TN from all subscription records relating to the split. It will also send delete subscription messages to each NEMSs 19 that support SCPs 18 and/or STPs 21 that require duplicate records during the permissive dialing period to remove the old TN from the SCP or STP databases. SCPs and/or STPs that do not require duplicate records during the NPA split permission period will not receive map changes or additional records.

Data stored in LSMS 14 is a relational database using tables and indexed fields. Such data can include, for example, subscription data, network data, service provider data, routing translation data (GTT DPC and SNN), NPAC configuration data, and NEMS routing data. Data from the tables can be retrieved using GUI 40 or by using a database query and reporting tool. Since the data is stored in relational tables, it may be retrieved and sorted on all fields. The database has keyed index fields that enable data to be retrieved in sorted order if the key fields are used during a query.

All subscription data down loaded from NPAC 12 will preferably be stored in the LSMS 14 database. When a subscription version has been removed from the system, the version status will preferably be changed to old. Network data will preferably also be down loaded by NPAC 12 to LSMS 14. This data comprises new NPA-NXXs and LRNs that are available for porting. When this data is downloaded to LSMS 14, it will be stored in the database and will be used to validate against subscription data received from NPAC 12.

LSMS 14 is configured to manage two forms of service provider data, all carrier service provider IDs and names, and service provider data that specific to the carrier that operating the LSMS, referred to as owner service provider data. Owner service provider data may be changed on NPAC 12.

Another feature of LSMS 14 is that routing data (DPC and SSN for CLASS, LIDB, ISBM, and CNAM) may be translated to a carrier's internal routing information as it is received from NPAC 12. Such translation is preferred so that Gateway addresses may be converted to the appropriate intranet-work address for proper routing. When translation occurs, an indicator is set in the subscription record so that correct audit information is returned to NPAC 12 during an audit.

For each NPAC 12 that is connected to LSMS 14, contact data that is specific to the NPAC operation center and the networking address information is maintained in the LSMS database. Further, for each NEMS that is connected to an LSMS, routing information that pertains to the NEMS is maintained in the LSMS database.

The interface with NEMS 19 preferably supports security access parameters that validate other systems trying to connect to the LSMS. Both LSMS 14 and associated NEMS 19 are required to establish an association before data transmission or reception may occur.

LSMS 14 may be constructed to be scaleable to meet initial and future LNP requirements for LSMS functionality. Subscription record capacity may be increased by increasing fixed disc storage space. Typically about 3 gigabits of memory will be required per one million subscription records.

Software run by LSMS 14 will preferably use an HP-UX version 10.20 operating system. The software will be preferably executed on a HP-9000K-CLASS Enterprise server (or similar UNIX server). A PA-8000 64 bit RISC processor or higher will preferably be employed. All memory, disc and archival devices will preferably be supported by HP-UX and the HP-9000 architecture. The storage capacity required by LSMS 14 will be based on a variety of factors, including storage subscription data, transient activity, log file sizing, NPAC LSMS interface transaction performance, NEMS IM transaction performance, the number of users, the number of attached NPACs and the number of attached NEMs. Also, LSMS 14 can be configured to support high availability using HP MC/service guard.

Figure 5:
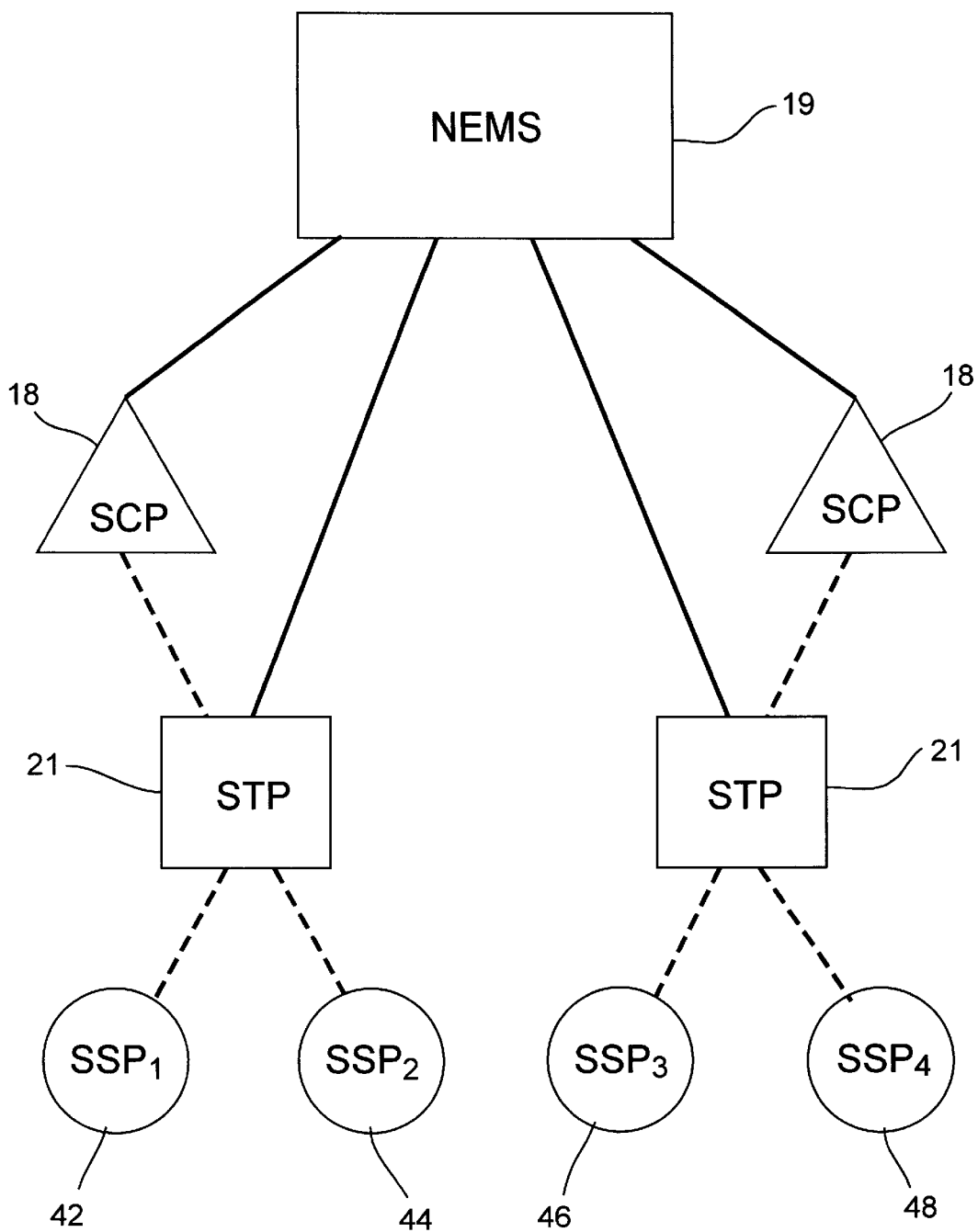
FIG. 5 illustrates a plurality of switches which are owned by different local service providers and which share a set of common network elements according to the invention.

One exemplary feature of system 10 is its ability to be adapted to assist small local service providers in competing in the local service market. An example of this feature is illustrated in FIG. 5. FIG. 5 illustrates an NEMS 19 which is typical of an NEMS which would be included in system 10. Attached to NEMS 19 are a plurality of SCPs 18 and STPs 21, similar to that previously described in connection with FIG. 1. A plurality of switches 42, 44, 46 and 48 are in communication with selected STPs and/or SCPs. Each of switches 42–48 is illustrated with a subscripted reference numeral 1–4 to indicate that each of the switches is owned and serviced by a different local service provider. In this way, local service providers can attach their own switches to network elements which are in turn serviced by a main service provider. In this way, a larger service provider may rent or sell space on their network elements to smaller service providers, thereby providing the smaller service providers with the ability to compete in the local service market.

When a person or business wishes to port their number to one of these local service providers, they simply contact such a provider and the subscription data is eventually entered into NPAC 12 so that calls will appropriately be routed similar to the method previously described herein.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A method for providing local number portability, comprising:

transmitting subscription data to an administration center from an entry system;

transmitting the subscription data from the administration center to a service system; and directly comparing the subscription data at the entry system with the subscription data at the service system.

2. A method as in claim 1, further comprising producing a report of the comparison.

3. A method as in claim 1, further comprising indicating an error condition if the entry system subscription data differs from the service system subscription data.

4. A method as in claim 1, further comprising comparing the entry system subscription data or the service system subscription data with the administration center subscription data.

5. A method as in claim 1, further comprising provisioning at least one network element based on the subscription data stored in the service system.

6. A method as in claim 5, wherein the network element is provisioned to activate, disconnect or update a subscription request from the administration center.

7. A method as in claim 5, further comprising comparing at least some of the subscription data at the service system with the subscription data transmitted to the network element.

8. A method as in claim 7, wherein the compared subscription data includes data selected from the group consisting of GTT data, LRN data, service provider data and telephone numbers.

9. A method as in claim 1, further comprising periodically determining if a subscription request from the administration center has been provisioned.

10. A method as in claim 1, further comprising periodically evaluating the history of a subscription.

11. A method for verifying call processing information transmitted to an administration center from an entry system and then to a service system, the method comprising:

directly comparing the call processing data stored at the entry system with the call processing data stored at the service system; and indicating any discrepancies between the call processing data stored at the entry system with the call processing data stored at the service system.

12. A telecommunications system for use with an administration center having an administration database for storing and updating subscription information, the system comprising:

an entry system having an entry database for storing subscription information, wherein the entry system is adapted to be placed into communication with the administration center; and a service system which is adapted to be placed in communication with the administration center, the service system including a service database for storing subscription information from the administration center;

wherein the entry system and service system are in direct communication with each other to allow for direct comparisons between corresponding subscription information in the entry database and the service database.

13. A system as in claim 12, wherein the subscription information includes information relating to a request to port a local telephone number from one carrier to another carrier.

14. A system as in claim 12, wherein the entry system has an open interface to allow external access to the entry database.

15. A system as in claim 14, wherein the open interface comprises a graphical user interface which may be accessed with a Web browser.

16. A system as in claim 12, wherein the service system has an open interface to allow external access to the service database.

17. A system as in claim 16, wherein the open interface comprises a graphical user interface which may be accessed with a Web browser.

18. A system as in claim 12, further comprising a plurality of network elements which are provisioned by a network element management system interfacing the network elements to the service system.

19. A local number portability system arranged in a telecommunications management network framework and which is adapted for use with an administration center having an administration database for storing and updating subscription data, the system comprising:

an entry system having an entry database for storing subscription data, wherein the entry system is in a service management layer and is adapted to be placed into communication with the administration center; and a service system which is adapted to be placed in communication with the administration center and which includes a service database for storing subscription information, wherein the service system is in a network management layer.

20. A system as in claim 19, wherein the service management layer is adapted to receive service systems providing for order entries and business support services.

21. A system as in claim 19, wherein the network management layer is adapted to receive management systems which manage all network elements which are service by the service system.

22. A system as in claim 19, further comprising a network element management system for transmitting subscription data to at least one network element, wherein the network element management system is in communication with the service system, and wherein the network management system is in an element management layer.

23. A system as in claim 22, wherein the element management layer is adapted to receive management systems which manage each network element on an individual basis.

24. A system as in claim 22, further comprising a plurality of network elements in communication with the network management system, wherein the network elements are in a network element layer.

25. A system as in claim 19, wherein the entry system and service system are in direct communication with each other to allow for direct comparisons between corresponding subscription information in the entry database and the service database.

26. A system as in claim 19, wherein the entry system and the service system each have an open interface to allow external access to their entry databases, and wherein each open interface comprises a graphical user interface which may be accessed with a Web browser.

27. A method for providing local number portability services to a telecommunications system arranged in a telecommunications management network framework, the method comprising:

placing an entry system in a service management layer of the telecommunications system to receive subscription requests and to transmit subscription information to an administration center; and placing a service system in a network management layer of the telecommunications system to receive subscription information from the administration center and to provision network elements of the telecommunications system based on the subscription information.

28. A method as in claim 27, further comprising placing a network element management system in an element management layer, when the network management system is situated between the service system and the network elements to provision the network elements based on the subscription information transmitted from the service system.

29. A method as in claim 27, further comprising placing the entry system and the service system in direct communication and directly comparing the subscription information stored in the entry system and the service system.

30. A method as in claim 27, further comprising externally accessing the subscription information in the entry system and the service system through an open interface with a Web browser.

31. A method as in claim 28, further comprising comparing at least some of the subscription information at the service system with the subscription information transmitted to the network elements.

32. A method as in claim 31, wherein the compared subscription information includes data selected from the group consisting of GTT data, LRN data, service provider data and telephone numbers.

33. A method as in claim 27, further comprising periodically determining if a subscription request from the administration center has been provisioned.

34. A method as in claim 27, further comprising periodically evaluating the history of a subscription request.

35. A method for providing local number portability services to a plurality of different service providers which share at least one common network element, wherein the common network element is serviced by a service management system which is in parallel with a plurality of service management systems, each of which is in communication with an administration center to receive porting requests, the method comprising:

placing switches serviced by a plurality of different service providers in communication with the common network element;

transmitting information regarding a port request to the common network element from the associated service management system; and transmitting call routing information from the common network element to the switch serviced by the service provider of a calling party to route the call to the switch of a called party.

36. A method for providing call processing services to a plurality of different service providers which share at least one common network element, the method comprising:

placing switches serviced by a plurality of different service providers in communication with the common network element;

transmitting call processing information to the common network element from an associated service management system; and transmitting call routing information based on the transmitted information.

37. A method as in claim 36, wherein the service management system is in parallel with a plurality of service management systems, each of which is in communication with an administration center to receive processing information.

38. A telecommunications system, comprising:

a service management system serviced by a main service provider;

at least one network element in communication with the service management system which receives call routing information from the service management system; and a plurality of switching devices in communication with the network element, wherein at least some of the switching devices are operated by different service providers;

wherein the service management system includes a database which stores local number portability subscriptions and includes a means for transmitting at least a portion of the subscription information to the network element.

39. A system as in claim 38, wherein the network element comprises a STP element or SCP element.

40. A system as in claim 38, wherein the service management system is adapted to be placed in communication with an administration center having portability subscription information.

41. A system as in claim 38, further comprising a network element management system which interfaces the service management system to the network element.

42. A telecommunications system, comprising:

a local service management system having an interface adapted to selectively interface with a plurality of administration centers; and an entry system having an interface adapted to selectively interface with a plurality of administration centers.

43. A system as in claim 42, wherein the interface is a modular interface which can be selectively removed and replaced with another interface to accommodate different types of administration centers.

44. A system as in claim 42, wherein each administration center has an identification code, and wherein each local service management system includes a means to configure the interface to communicate with the administration center to which the local service management system is interfaced.

* * * * *